Patented Jan. 7, 1930

1,743,034

UNITED STATES PATENT OFFICE

JAROSLAW FRÖHLICH, OF BASEL, SWITZERLAND, ASSIGNOR TO SOCIETY OF CHEMICAL INDUSTRY IN BASLE, OF BASEL, SWITZERLAND

DYESTUFF AND PROCESS OF MAKING SAME

No Drawing. Application filed July 28, 1926, Serial No. 125,590, and in Switzerland September 16, 1925.

The present invention relates to new vat dyestuffs which are particularly valuable for the production of fast tints on the animal fibre. The invention comprises the new dyestuffs, the method of making same and the material dyed with the new dyestuffs.

In the United States specification No. 1,575,678 there are described dyestuffs which are obtained by action of sulfur dichloride on 2:5-diarylidobenzoquinones.

According to the present invention similar dyestuffs are produced when, instead of sulfur dihalide a mixture of sulfur dihalide with an excess of halogen, for instance a solution of chlorine or bromine in sulfur dichloride, is caused to act upon a 2:5-diarylidobenzoquinone.

The dyestuffs thus obtained of which the constitution is not known are brown to black powders and are insoluble in water and in alcohol; on the other hand, they dissolve in sulfuric acid to a solution which is red-violet to violet, blue, green, olive and grey. The dyestuffs are vatted easily with hydrosulfite and caustic soda solution with formation of bright yellow to brownish and greenish vats, which dye the fibre, preferably wool, fast yellow to red-orange, violet, brown, blue, grey and black shades.

The reaction is advantageously conducted in a solvent or dispersing agent, those coming chiefly into consideration being nitrobenzene, chlorobenzene, carbon tetrachloride or chlorethane; other media for conducting the reaction may have a condensing action, such as sulfuric acid, formic acid, acetic acid, acetic anhydride, etc.

The proportions in which the substances are brought into reaction, as well as the proportion of halogen to sulfur dihalide may be varied within wide limits. This is also true of the temperature and the duration of the reaction; with the same parent materials different coloured tints may be obtained by choice of the conditions of the reaction. In general it may be observed that vivid tints are obtained when the temperature is not too high, whereas higher temperatures favour the formation of dark dyeings. The tint may also be influenced by certain additions, such as agents that fix acids, or condensing agents or carriers, such as zinc chloride or iodine.

The 2:5-diarylidobenzoquinones coming into question are those which are not further substituted in the quinone nucleus or have only one or two substituents in the 3- and 6-positions; further, the 2:5-diarylido-groups may be derived from two identical or different aromatic amines which may be substituted both once at the nitrogen and in the nucleus one or more times in any position. As substituents come chiefly into consideration halogen, alkyl-, alkyloxy-, phenyloxy-, nitro-, amino-, alkyamino-, aralkyamino-, arylamino-, hydroxyl- or carboxyl-groups.

The following examples illustrate the invention, the parts being by weight:—

*Example 1*

5.8 parts of dianilidobenzoquinone corresponding with the formula

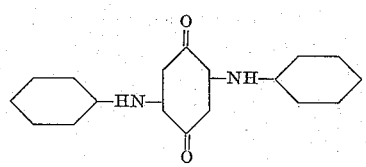

are introduced into about 20 times their weight of nitrobenzene and there is added at 5° C. 2.8 parts of a solution of chlorine in sulfur dichloride corresponding with the composition $SCl_3$ (the proportion of dianilidobenzoquinone to $SCl_3=1$ mol. to 1 mol.). After some time the mixture is filtered and the solid matter is washed with alcohol and dried. There is obtained a yellow brown powder which dissolves in concentrated sulfuric acid to a red-violet solution and dyes wool yellow-olive in a bright yellow hydrosulfite vat.

If the mixture is heated to 100° C. after the addition of the solution of chlorine in sulfur dichloride and is maintained at this temperature for some time, there is obtained a dyestuff in the form of a blackish powder which dissolves in sulfuric acid to a red-violet colour and dyes wool blackish-olive.

If the temperature be raised to the boiling point of the nitrobenzene there is obtained a product which dissolves in concentrated sulfuric acid to a red-violet colour and dyes wool black-brown.

Example 2

The procedure is as described in Example 1, except that 5.6 parts SCl₃ are used (1 mol. arylidobenzoquinone to 2 mols. SCl₃); there is obtained at the ordinary temperature a reddish-brown powder which dissolves in sulfuric acid to a dirty violet solution and dyes wool brown. At 100° C. there is obtained a dark brown powder which dissolves in sulfuric acid to a red-violet solution and dyes wool olive. At the boiling point of nitrobenzene there is obtained a blue-grey powder which dissolves in sulfuric acid to a dirty green-blue solution and dyes wool blue-grey.

The corresponding dyestuff from 2:5-diorthotoluidinobenzoquinone dissolves in concentrated sulfuric acid with blue coloration and dyes wool bluish-olive tints, the dyestuff derived from the 2:5-dimonomethylanilidobenzoquinone corresponding with the formula:

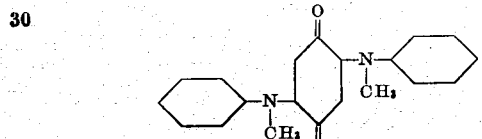

dissolves in concentrated sulfuric acid with bluish-green coloration and dyes wool greenish-grey. From dianilidobenzoquinone and a mixture of 1 molecular proportion of SCl₂ and 1 molecular proportion of bromine there is obtained a product dissolving in concentrated sulfuric acid with blue coloration and dyeing wool black-green tints.

Example 3

11.6 parts of 2:5-dianilidobenzoquinone and 0.2 part of iodine are introduced into about 110 parts of nitrobenzene and there are added at 5° C. and in one portion 16.8 parts of a solution of chlorine in sulfur dichloride corresponding with the composition SCl₃ (1 mol. diarylidoquinone to 3 mols. SCl₃). The mixture is stirred for some time while maintaining the temperature constant, and there is then added a solution of sodium carbonate of 10 per cent. strength until the mass is neutral in reaction, any considerable rise of temperature being avoided; 3.6 parts of sodium carbonate dissolved in 20 parts of water are then added and the mixture stirred overnight. The nitrobenzene is expelled by steam and the residue is filtered, washed and dried. The dyestuff thus obtained is a brown powder which dissolves in sulfuric acid to a red-violet solution and dyes wool fast brown.

If the temperature is raised to 100° C. after the addition of the solution of chlorine in sulfur dichloride, there is obtained a similar product which dyes wool red-brown; if the temperature be carried to the boiling point of nitrobenzene the product obtained dyes wool blue-grey and dissolves in sulfuric acid to a dirty olive solution.

The replacement in this example of the 2:5-dianilidobenzoquinone by the 4'.4''-dichloro-2:5-dianilidobenzoquinone corresponding with the formula:

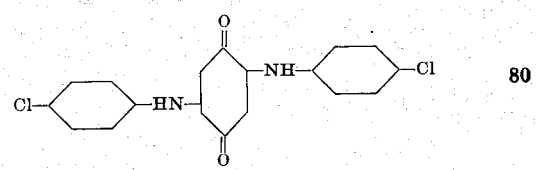

leads in the cold to a dyestuff which dissolves in concentrated sulfuric acid with red-blue coloration producing from a pale yellow vat yellow-brown tints. Raising the temperature to 100° C. there is obtained a product which dissolves also in sulfuric acid with red-blue coloration and dyes wool red-brown.

Example 4.

5.8 parts of dianilidobenzoquinone are introduced into a mixture of 78 parts of orthonitrotoluene and 39 parts of nitrobenzene and at −15° C. 11.1 parts (corresponding with 3 equivalents) of a solution of chlorine in sulfur dichloride corresponding with SCl₃ are added. After stirring at the said temperature for some time the mixture is diluted with alcohol and filtered, and the solid matter is dried. There is obtained a yellow-brown powder which dissolves in sulfuric acid to a red-violet solution and dyes wool in a hydrosulfite vat brown-yellow.

If the mixture is heated to 100° C. and remains for some time at this temperature there is obtained a red-brown powder which dissolves in sulfuric acid to a dull red-violet solution and dyes wool dark violet-brown.

The substitution in the foregoing examples of a mixture of composition SCl₄ for the mixture of composition SCl₃ leads in general to similar results. As an exception to this statement it may be added that the action of 2 molecular proportions of SCl₄ on 1 molecular proportion of dianilidobenzoquinone at 100° C. leads to a red-brown dyestuff instead of an olive dyestuff.

If more halogen-sulfurdihalide is used, for instance a proportion of 4 mols. or more to 1 mol. of arylidobenzoquinone, similar phenomena are observed, but it is to be noted that the yield of dyestuff or the intensity of the dyestuff may be diminished.

Among products of this kind there may be mentioned for instance the dyestuffs which are obtained from 2:5-diparaanisidinobenzoquinone corresponding with the formula:

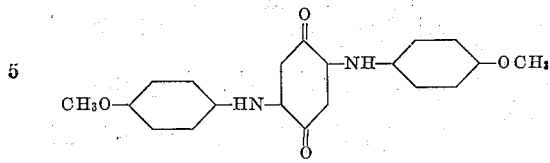

or from 2:5-diparaphenetidinobenzoquinone. In the cold there are obtained violet-brown dyestuffs, at 100° C. grey-violet dyeing dyestuffs are obtained. Both products dissolve in concentrated sulfuric acid with green-blue coloration.

The use of 2:5-dianilido-6-methyl-1:4-benzoquinone instead of 2:5-dianilidobenzoquinone is advantageous in so far as almost throughout fuller dyestuffs carrying more bloom are obtained.

For the manufacture of especially profitable and pure dyestuffs the addition of an agent adapted to fix acids may be advantageous. The products which may for instance be obtained from dianilidobenzoquinone and 4 molecular proportions of a solution of chlorine in sulfur dichloride corresponding with the formula $SCl_3$ yield at ordinary temperature and at 100° C. in presence of chalk or magnesia dyestuffs which dye wool bright and full brown tints. They dissolve in concentrated sulfuric acid with pure violet coloration. A mixture corresponding with the composition $SCl_4$ yields somewhat redder products. Valuable products are also obtained if mixtures are employed which contain less chlorine than the quantity of chlorine corresponding with the compound $SCl_3$, i. e. a mixture corresponding with the composition $S_2Cl_5$.

*Example 5*

33 parts of 6-chloro-2:5-dianilidobenzoquinone corresponding with the formula

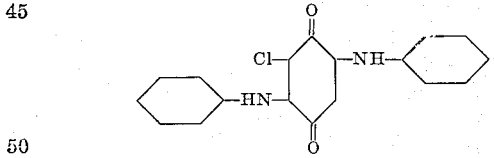

are introduced into 1000 parts of nitrobenzene and while stirring at 5° C. 14 parts of a solution of chlorine in sulfur dichloride having the composition $SCl_3$ are added (1 mol. arylidoquinone to 1 mol. $SCl_3$). The process is conducted as described in Example 1 and the product obtained is a brown powder soluble in sulfuric acid to a dirty violet solution and dyeing wool bright brown.

If the temperature of the mixture is raised to 100° C. there is formed a superficially similar product which, however, produces an orange tint on wool. At the boiling point of nitrobenzene there is obtained a blackish powder which dissolves in sulfuric acid to a dull grey-green and dyes wool pure grey.

If the proportion of chlorine in sulfur dichloride is raised to 2 mols. of $SCl_3$ to 1 mol. of arylidoquinone there is obtained in the cold a product which dyes wool brownish-orange; at 100° C. a product which dyes wool brownish-red. Pronounced reddish products may also be obtained by use of 3 molecular proportions of $SCl_3$ at 100° C. or with 1 or 2 molecular proportions of $SCl_4$ at 100° C.

By selection of other 2:5-diarylidobenzoquinones there are obtained products having other dyeing properties. Thus, from 1 molecular proportion of 2:5-di-α-naphthylaminobenzoquinone corresponding with the formula:

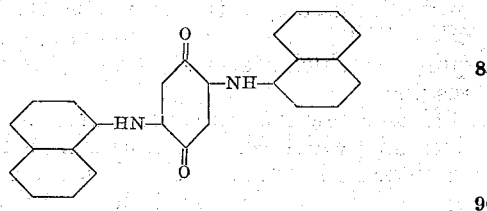

and 2 molecular proportions of a solution of chlorine in sulfur dichloride of the composition $SCl_3$, there is obtained in the cold a dyestuff which dissolves in sulfuric acid to a green solution and yields on wool a covered blue. The use under like conditions of 2:5-di-β-naphthylaminobenzoquinone again leads to a yellow-brown dyestuff.

In all of the examples nitrobenzene or nitrotoluene are employed as diluent. In some cases other solvents may be used advantageously as for instance carbon tetrachloride, tetra chloroethane, chlorobenzenes, acetic acid, acetic acid anhydride, etc. Thus a full brown dyeing dyestuff is obtained at 100° C. by reaction of 4 molecules of a mixture of $SCl_2$ and chlorine corresponding with the composition $SCl_4$ on dianilidobenzoquinone. The dyestuff thus obtained dissolves in concentrated sulfuric acid with violet coloration.

What I claim is:—

1. As a new process the manufacture of vat dyestuffs, which consists in causing solutions of halogens in sulfur dichloride, which solutions contain a halogen-sulfur ratio of at least $S_2X_5$ where X is a halogen with atomic weight of 35.4 to 126.9, to act upon 2:5-diarylidobenzoquinones.

2. As a new process the manufacture of vat dyestuffs, which consists in causing solutions of halogens in sulfur dichloride, which solutions contain a halogen-sulfur ratio of at least $S_2X_5$ where X is a halogen with atomic weight of 35.4 to 126.9, to act upon 2:5-diarylidobenzoquinones in presence of a diluent.

3. As a new process the manufacture of vat dyestuffs, which consists in causing solutions of chlorine in sulfur dischloride, which solutions contain a chlorine-sulfur ratio of at least $S_2Cl_5$ to act upon 2:5-diarylidobenzoquinones in presence of a diluent.

4. As a new process, the manufacture of vat dyestuffs, which consists in causing solutions of chlorine in sulfur dichloride, which solutions contain a chlorine-sulfur ratio of at least $S_2Cl_5$ to act upon 2:5-dianilidobenzoquinones in presence of a diluent.

5. As a new process, the manufacture of vat dyestuffs, which consists in causing solutions of chlorine in sulfur dichloride, corresponding with the composition formula $SCl_2+Cl$ to $2SCl_2+Cl$ to act upon 2:5-dianilidobenzoquinones in presence of a diluent.

6. As a new process, the manufacture of vat dyestuffs, which consists in causing solutions of chlorine in sulfur dichloride, corresponding with the composition formula $SCl_2+Cl$ to $2SCl_2+Cl$ to act upon 2:5-dianilidobenzoquinones which are substituted in the anilido residue.

7. As a new process, the manufacture of vat dyestuffs, which consists in causing solutions of chlorine in sulfur dichloride, corresponding with the composition $SCl_2+Cl$ to $2SCl_2+Cl$, to act upon 2:5-dianilidobenzoquinone which are halogenated in the anilido residue, in presence of a diluent.

8. As new products, the dyestuffs obtained from 2:5-diarylidobenzoquinones and solutions of halogens in sulfur dichloride containing a halogen-sulfur ratio of at least $S_2X_5$ where X is a halogen with atomic weight of 35.4 to 126.9, which products form brown to black powders insoluble in water and in alcohol, dissolving in concentrated sulfuric acid to red-violet to violet, blue, green, olive and grey solutions and yielding with caustic soda solution and hydrosulfite bright yellow to brownish and greenish vats, which dye the fibre, preferably wool, fast yellow to red-orange, violet, brown, blue, grey and to black shades.

9. As new products the dyestuffs obtained from 2:5-diarylidobenzoquinones in solutions of chlorine in sulfur-dichloride, containing a chlorine-sulfur ratio of at least $S_2Cl_5$, which products form brown to black powders insoluble in water and in alcohol, dissolving in concentrated sulfuric acid to red-violet to violet, blue, green, olive and grey solutions and yielding with caustic soda solution and hydrosulfite bright yellow to brownish and greenish vats, which dye the fibre, preferably wool, fast yellow to red-orange, violet, brown, blue, grey and black shades.

10. As new products the dyestuffs obtained from 2.5-dianilidobenzoquinones in solutions of chlorine in sulfur dichloride, containing a chlorine-sulfur ratio of at least $S_2Cl_5$, which products form brown to black powders insoluble in water and in alcohol, dissolving in concentrated sulfuric acid to red-violet, violet and greenish-blue solutions and yielding with caustic soda solution and hydrosulfite bright yellow to brownish and greenish vats which dye the fibre, preferably wool, fast yellow to red-orange, brown and blackish shades.

11. Material dyed with the dyestuffs of claim 8.

12. Material dyed with the dyestuffs of claim 9.

13. Material dyed with the dyestuffs of claim 10.

In witness whereof I have hereunto signed my name this 14th day of July 1926.

JAROSLAW FRÖHLICH.